United States Patent
Ranjan

(10) Patent No.: US 8,260,914 B1
(45) Date of Patent: Sep. 4, 2012

(54) DETECTING DNS FAST-FLUX ANOMALIES

(75) Inventor: Supranamaya Ranjan, Albany, CA (US)

(73) Assignee: Narus, Inc., Sunnyvale, CA (US)

( * ) Notice: Subject to any disclaimer, the term of this patent is extended or adjusted under 35 U.S.C. 154(b) by 268 days.

(21) Appl. No.: 12/821,098

(22) Filed: Jun. 22, 2010

(51) Int. Cl.
*G06F 15/16* (2006.01)
*G06F 11/00* (2006.01)

(52) U.S. Cl. .......................... 709/224; 726/23

(58) Field of Classification Search .......... 709/217–219, 709/223–229; 726/12–13, 22–25
See application file for complete search history.

(56) References Cited

U.S. PATENT DOCUMENTS

| | | | |
|---|---|---|---|
| 8,112,804 B2 * | 2/2012 | Kwon et al. | 726/23 |
| 2008/0155694 A1 * | 6/2008 | Kwon et al. | 726/23 |
| 2010/0281539 A1 * | 11/2010 | Burns et al. | 726/23 |
| 2011/0153811 A1 * | 6/2011 | Jeong et al. | 709/224 |
| 2011/0283357 A1 * | 11/2011 | Pandrangi et al. | 726/22 |
| 2011/0302656 A1 * | 12/2011 | El-Moussa | 726/24 |
| 2012/0054869 A1 * | 3/2012 | Yen et al. | 726/24 |
| 2012/0084860 A1 * | 4/2012 | Cao et al. | 726/23 |
| 2012/0096549 A1 * | 4/2012 | Amini et al. | 726/23 |

* cited by examiner

*Primary Examiner* — Brendan Higa
(74) *Attorney, Agent, or Firm* — Fernandez & Associates, LLP

(57) ABSTRACT

A method for detecting automatically generated malicious domain names in a network. The method includes identifying a plurality of domain name service (DNS) queries in the network, wherein the plurality of DNS queries share a common attribute, analyzing, using a central processing unit (CPU) of a computer, the plurality of DNS queries to identify a plurality of alphanumeric elements embedded in a set of domain names associated with the plurality of DNS queries, analyzing, using the CPU, the plurality of alphanumeric elements to determine a distribution metric of the set of domain names, and generating an alert based on the distribution metric according to a pre-determined criterion.

16 Claims, 4 Drawing Sheets

| Type of class | # of components | # of IP addresses | # of domain names | Types of components found |
|---|---|---|---|---|
| Many-to-many | 440 | 11K | 35K | Legitimate services (Google, Yahoo), CDNs, Cookie tracking, Mail service, Conficker botnet |
| IP fans | 1.6K | 1.6K | 44K | Domain Parking, Adult content, Blogs, small websites |
| Domain fans | 930 | 8.0K | 0.3K | CDNs (Akamai), Ebay, Yahoo, Mjuyh botnet |

FIG. 3

DETECTING DNS FAST-FLUX ANOMALIES

BACKGROUND OF THE INVENTION

1. Field of the Invention

The present invention relates to computers and computer networks. More particularly, the invention relates to detecting malicious activities in the computer network.

2. Background of the Related Art

The term "botnet" refers to a collection of malicious software agents (referred to as robots) that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Several botnets have been found and removed from the Internet. The Dutch police found a 1.5 million node botnet and the Norwegian ISP (Internet service provider) Telenor disbanded a 10,000-node botnet. Large coordinated international efforts to shut down botnets have also been initiated. It has been estimated that up to one quarter of all personal computers connected to the internet may be part of a botnet.

A botnet's originator (i.e., operator or controller) can control the bots remotely, usually through a means such as IRC (Internet Relay Chat), from a command-and-control (C&C) server. Though rare, more experienced botnet operators program their own commanding protocols from scratch. For example, these protocols may include a server program for C&C and a client program for operation that embeds itself on the victim's machine (i.e., bot). Both programs usually communicate with each other over a network using a unique encryption scheme for stealth and protection against detection or intrusion into the botnet network.

Recent botnets such as Conficker (e.g., described in P. Porass et al. "An analysis of conficker's logic and rendezvous points", SRI International Technical report, March 2009), Kraken, and Torpig (e.g., described in B. Stone-Gross et al. "Analysis of a botnet takeover", ACM Conference on Computer and Communications Security (CCS), November 2009) have exploited a particular method for botnet operators to control their bots, namely the DNS "domain fluxing". In this method, each bot algorithmically generates a large set of domain names and queries each of them until one of them is resolved and then the bot contacts the corresponding IP-address obtained that is typically used to host the C&C server. In particular, the corresponding domain name is registered by the botnet operator for the C&C purpose. Beyond domain fluxing for the purpose of command-and-control of a botnet, spammers also routinely generate random domain names in order to avoid detection. For instance, a spammer typically advertises randomly generated domain names in spam emails (e.g., to promote spammed products on the spammer's website) to avoid detection by regular expression based domain blacklists that maintain signatures for recently "spamvertised" (i.e., advertised by spam emails) domain names. This is done to evade domain blacklists that identify domain names hosting malware, spyware, etc. Specifically, a spammer would generate many random URLs, possibly on different Top Level Domains (e.g., .org, .com, .ws, etc.) and then map those URLs to the same set of IP-addresses, where these IP-addresses are used for hosting promotions for the products promoted by the spammer. Typically, these URLs are advertised in the spam emails sent out by the spammer.

The botnets that have used random domain name generation vary widely in the random word generation algorithm as well as the way it is seeded. Generally, a botnet operator only has to register one or a few domains out of the large number of domains that each bot would query every day. Whereas, security vendors would have to pre-register all the domains that a bot queries every day in a blocking effort before one or a few of these domains are registered by the botnet operator. For instance, Conficker-A bots generate 250 domains every three hours while using the current date and time at UTC (i.e., coordinated universal time) as the seed, which in turn is obtained by sending empty HTTP GET queries to a few legitimate sites such as google.com, baidu.com, answers.com, etc. This way, all bots would generate the same domain names every day. In order to make it difficult for a security vendor to pre-register the domain names, the next version, Conficker-C increased the number of randomly generated domain names per bot to 50 thousand from which each bot would randomly choose 500 domains to query. In all the cases above, the security vendors would have to reverse engineer the bot program (e.g., executable code) to derive the exact algorithm being used for generating domain names (e.g., by Conficker, Kraken, Torpig, etc.) such that they can be blocked.

Generally, reverse engineering effort applied to the domain generation algorithm is not scalable for similar future attacks. In addition, DNS "domain fluxing" may be combined with DNS "IP fast-fluxing" where one domain name is mapped to a changing set of IP-addresses. Such combination would be even more difficult to detect. In summary, reverse engineering of botnet executables is resource-intensive and time-intensive such that precious time may be lost before the domain generation algorithm can be cracked to detect such domain name queries generated by bots.

SUMMARY

In general, in one aspect, the invention relates to a method for detecting automatically generated malicious domain names in a network. The method includes identifying a plurality of domain name service (DNS) queries in the network, wherein the plurality of DNS queries share a common attribute, analyzing, using a central processing unit (CPU) of a computer, the plurality of DNS queries to identify a plurality of alphanumeric elements embedded in a set of domain names associated with the plurality of DNS queries, analyzing, using the CPU, the plurality of alphanumeric elements to determine a distribution metric of the set of domain names, and generating an alert based on the distribution metric according to a pre-determined criterion.

In general, in one aspect, the invention relates to a non-transitory computer readable medium storing instructions for detecting automatically generated malicious domain names in a network. The instructions when executed by a processor of a computer includes functionality for identifying a plurality of domain name service (DNS) queries in the network, wherein the plurality of DNS queries share a common attribute, analyzing, using a central processing unit (CPU) of a computer, the plurality of DNS queries to identify a plurality of alphanumeric elements embedded in a set of domain names associated with the plurality of DNS queries, analyzing, using the CPU, the plurality of alphanumeric elements to determine a distribution metric of the set of domain names, and generating an alert based on the distribution metric according to a pre-determined criterion.

In general, in one aspect, the invention relates to a system for detecting automatically generated malicious domain names in a network. The system includes a detecting module configured to capture a plurality of domain name service (DNS) queries in the network, wherein the plurality of DNS queries share a common attribute, an analyzer module configured to analyze the plurality of DNS queries to identify a plurality of alphanumeric elements embedded in a set of domain names associated with the plurality of DNS queries and analyze the plurality of alphanumeric elements to determine a distribution metric of the set of domain names, and a processor and memory storing instructions when executed by the processor comprising functionality to compare the distribution metric and a pre-determined threshold to generate a result and generate an alert based on the distribution metric according to a pre-determined criterion.

Other aspects and advantages of the invention will be apparent from the following description and the appended claims.

BRIEF DESCRIPTION OF DRAWINGS

FIG. 3 shows an example according to aspects of the invention.

DETAILED DESCRIPTION

Figure 1:
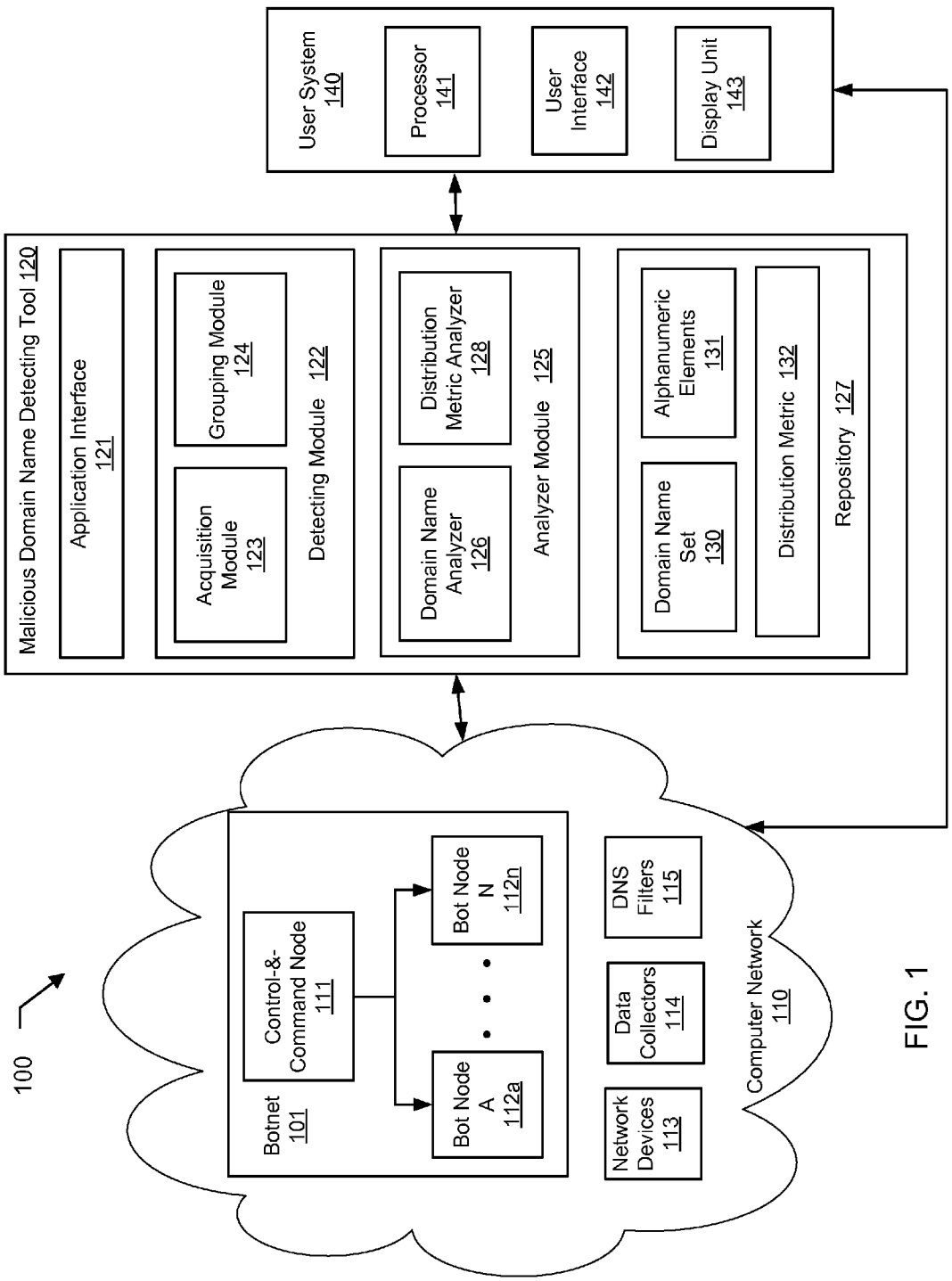
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In traditional approaches for detecting malicious machines, the complete network traffic of the machines is analyzed. The volume of the network traffic can be extremely high and analyzing such volumes of traffic to detect malicious activity is challenging. The network traffic of all the machines in the network would need to be analyzed to differentiate between malicious and legitimate machines. Embodiments of the invention use the Internet Domain Name Service (DNS) replies returned by the DNS servers for detecting malicious machines. When an endhost makes a request to a DNS server to resolve a domain name, the DNS server returns a reply to the request with a set of IP addresses registered by the website. The volume of such DNS requests is significantly smaller compared to the complete network trace. For example, in an example ISP trace of the size 66 GB, the DNS traffic volume is about 237 MB in the entire trace.

As described above, DNS based "domain fluxing" has been used for command-and-control of a botnet where each bot queries for existence of a series of automatically generated domain names from which the botnet operator has to register only one such domain name for establishing communications with the bots in the botnet. Further, automatically generated domain names may also be used by spam email campaign operators. Generally, embodiments of the invention are configured to detect such automatically generated domain names by identifying patterns inherent to domain names that are generated algorithmically, in contrast to those generated by humans. For example, statistical distribution of alphanumeric character elements (e.g., single alphanumeric character referred to as a unigram, two consecutive alphanumeric characters referred to as a bigram, n-consecutive alphanumeric characters referred to as a n-gram) is analyzed in all domain names that are mapped to the same set of IP-addresses. Throughout this document, the term "alphanumeric character" refers to any character, alphabet, numeral, digit, symbol, icon, etc. that can be used in a valid domain name, for example as specified in RFC 1912 known to those skilled in the art. In one or more embodiments, several distance metrics, such as KL-distance are used to represent such statistical distribution of alphanumeric character elements.

In one or more embodiments, the invention includes a training phase and a detecting phase. For example, a good dataset of domains obtained via a crawl of domains mapped to all IPv4 address space may be used in the training phase while the detecting phase may be tested by modeling bad datasets based on observed historical botnet behaviors. For calibration purpose, packet traces collected at a Tier-1 ISP has been used as test data to automatically detect domain fluxing as used by Conficker botnet with minimal false positives.

In one or more embodiments, the invention detects algorithmically generated domain names while monitoring DNS traffic without using the knowledge of a reverse engineered domain generation algorithm. Accordingly, DNS traffic is analyzed to detect if and when domain names are being generated algorithmically to generate an alert pointing to the presence of bots within a network such that the network administrator can activate security operations such as disconnecting bots from their C&C server by filtering out DNS queries to such algorithmically generated domain names.

In one or more embodiments, the invention is based on the model that botnets do not use well formed and pronounceable language words in the domain name collection since the likelihood that such a word is already registered at a domain registrar is very high, which defeats the purpose of the botnet operator because such already registered legitimate domain name can not be used to control bots in the botnet. Examples of domain names associated with known botnets are shown in TABLE 1 below.

TABLE 1

| Type of group | Domain names |
| --- | --- |
| Conficker botnet | vddxnvzqjks.ws |
| | gcvwknnxz.biz |
| | joftvvtvmx.org |
| Mjuyh bot | 935c4fe[0-9a-z]+.6.mjuyh.com |
| | c2d026e[0-9a-z]+.6.mjuyh.com |

Accordingly, embodiments of the invention analyze the algorithmically generated domain names to identify characteristics vastly different from legitimate domain names. In one or more embodiments, the invention uses techniques from signal detection theory and statistical learning to detect algorithmically generated domain names that may be generated using techniques such as (i) pseudo-random string generation algorithms as well as (ii) dictionary-based generators, for instance the one used by Krakenas well as a publicly available tool "Kwyjibo" that is capable of generating words that are pronounceable yet not in the English dictionary.

In summary, embodiments of the invention advantageously detect entities generating algorithmically generated domain names with (i) a short latency due to a much smaller amount of DNS traffic being analyzed instead of the entire network traffic and (ii) efficacy even if the rest of the traffic that sent by a bot is encrypted, which frequently occurs since after identifying the C&C server to communicate with, the bot may thereafter use HTTPS for further communication.

FIG. 1 shows a diagram of a system (100) for detecting machine generated malicious domain names in a computer network in accordance with one or more embodiments. The system (100) includes a malicious domain name detecting tool (120), a user system (140), and a computer network (110). The malicious domain name detecting tool (120) includes a storage repository (127), one or more application interfaces (121), a detecting module (122), and an analyzer module (125). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, a portion of the computer network (110) may be infected by malicious programs to form a botnet (101) including a control-and-command (C&C) node (111) and one or more bot nodes (e.g., bot node A (112a), bot node N (112n), etc.). Generally, the botnet (101) may cause additional malicious activities to affect and/or infect other network devices (e.g., network devices (113)) within the computer network (110). In one or more embodiments, certain device(s) (e.g., data collectors (114)) within the computer network (110) may be configured to collect network data (not shown) for providing to the malicious domain name detecting tool (120). In one or more embodiments, certain device(s) (e.g., DNS filters (115)) within the computer network (110) may be configured to sanction (e.g., passing or blocking) DNS traffic (e.g., DNS queries, not shown) based on information from the malicious domain name detecting tool (120). Each of these components is described below. One of ordinary skill in the art will appreciate that embodiments are not limited to the configuration shown in FIG. 1.

In one or more embodiments of the invention, the malicious domain name detecting tool (120) is configured to interact with the computer network (110) using one or more of the application interface(s) (121). The application interface (121) may be configured to receive data (e.g., network traffic data, not shown) from the computer network (110) and/or store received data to the storage repository (127). Such network data captured over a time period (e.g., an hour, a day, a week, etc.) is referred to as trace or network trace. For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious domain name detecting tool (120).

In one or more embodiments, the application interface (121) may be configured to provide data (e.g., alert or other results) and/or instruction (e.g., to initiate a network security operation) from the malicious domain name detecting tool (120) to the computer network (110). For example, an alert identifying detected malicious domain names or an instruction to block DNS queries and/or replies of such identified malicious domain names may be provided via the application interface (121) to the DNS filters (115). For example, the DNS filters (115) may include a DNS server configured to block certain domain names by specifying the blocked domain names in the DNS server policy, i.e., domain blacklisting. Further, the DNS filters (115) may include a network router that intercept and selectively block DNS traffic (e.g., DNS queries and/or replies) passing over the computer network (110) or a portion thereof. In particular, the identified malicious domain names may be used to facilitate the identification of a source node in the computer network (110) that sends one or more DNS queries of such malicious domain names. For example, once a malicious domain name is determined, the DNS flows/packets may be reviewed to determine which client in the network initiated the relevant DNS query: (1) the querier may be a DNS resolver acting on behalf of the actual client (i.e., source node) or (2) it may be the actual client (i.e., source node) which sent the query directly to the DNS server. In case (1) above, the logs maintained at the particular DNS resolver may be reviewed to find out the IP-address of the client (i.e., source node) which actually contacted this resolver.

Accordingly, one or more network router(s) located logically between the DNS server and the source node (e.g., a bot) sending the malicious DNS queries may be configured to act as the DNS filters (115) blocking such bot-generated DNS queries. In one or more embodiments, the DNS filters (115) may be configured in the computer network (110) by a network communication service provider (e.g., ISP), a network security service provider, or other business or government entities. In one or more embodiments, the malicious domain name detecting tool (120) is configured to support various data formats provided by the computer network (110).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the malicious domain name detecting tool (120). The user may include, but is not limited to, an individual, a group, an organization, or some other entity having authority and/or responsibility to access the malicious domain name detecting tool (120). Specifically, the context of the term "user" here is distinct from that of a user of the computer network (110). The user system (140) may be, or may contain a form of, an internet-based communication device that is capable of communicating with the application interface (121) of the malicious domain name detecting tool (120). Alternatively, the malicious domain name detecting tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious domain name detecting tool (120) (e.g., report, alert, etc.).

As shown, communication links are provided between the malicious domain name detecting tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious domain name detecting tool (120), the user system (140), and the communication links may be part of the computer network (110).

In one or more embodiments, a central processing unit (CPU, not shown) of the malicious domain name detecting tool (120) is configured to execute instructions to operate the components of the malicious domain name detecting tool (120) (e.g., storage repository (127), the application interface (121), the detecting module (122), and the analyzer module (125)). In one or more embodiments, the memory (not shown) of the malicious domain name detecting tool (120) is configured to store software instructions for analyzing the network trace to identify machine generated malicious domain names and issuing instructions to activate network security operations based on the analysis results. The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the malicious domain name detecting tool (120) is configured to obtain and store data in the storage repository (127). In one or more embodiments, the storage repository (127) is a persistent storage device (or set of devices) and is configured to receive data from the computer network (110) using the application interface (121). The storage repository (127) is also configured to deliver working data to, and receive working data from, the detecting module (122) and the analyzer module (125). The storage repository (127) may be a data store (e.g., a database, a file system, one or more data structures configured in a memory, some other medium for storing data, or any suitable combination thereof), which may include information (e.g., domain name set (130), alphanumeric elements (131), distribution metric (132), etc.) related to the malicious domain name detection. The storage repository (127) may be a device internal to the malicious domain name detecting tool (120). Alternatively, the storage repository (127) may be an external storage device operatively connected to the malicious domain name detecting tool (120).

In one or more embodiments, the malicious domain name detecting tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious domain name detecting tool (120) is configured to support various data formats provided by the user system (140).

In one or more embodiments, the malicious domain name detecting tool (120) includes the detection module (122) that is configured to obtain DNS queries and separate them into groups based on common attributes. In one or more embodiments, the detection module (122) includes the acquisition module (123) that is configured to acquire DNS queries from the network trace provided by the data collectors (114) via the application interface (121). For example, the acquisition module (123) may perform a reverse DNS crawl of the entire IPv4 address space with respect to the captured network trace to obtain the DNS queries. In another example, network trace is collected from across 100+ router links at a Tier-1 ISP in Asia to obtain a one day long trace including 270,000 DNS requests and corresponding replies.

In one or more embodiments, the detection module (122) includes the grouping module (124) that is configured to partition the obtained DNS queries into groups based on common attributes. In one or more embodiments, DNS queries in a partitioned group share a common top level domain name corresponding to the DNS queries. In one or more embodiments, DNS queries in a partitioned group share a common IP address that the DNS queries map to. In one or more embodiments, DNS queries in a partitioned group belong to a common connected component in an IP-domain bipartite graph of the DNS queries. In such embodiments, the connected component is identified by performing connected component analysis of the IP-domain bipartite graph of the DNS queries.

In one or more embodiments, the malicious domain name detecting tool (120) includes the analyzer module (125) that is configured to characterize distribution of alphanumeric elements in the domain names within each of the separated groups of DNS queries. In one or more embodiments, the analyzer module (125) includes the domain name analyzer (126) that is configured to identify and/or extract domain names within each of the separated groups of DNS queries and save these extracted domain names as a domain name set (e.g., domain name set (130)) in the repository (127). For example, such domain names may be identified and/or extracted from DNS queries, which are typically domain names proceeded by "DNS query". In an example, the domain name set (130) may correspond to DNS queries from known malicious or non-malicious network trace (referred to as a reference dataset) and used for training phase to fine tune the malicious domain name detecting tool (120). In other example, the domain name set (130) may correspond to DNS queries under test and is referred to as a grouped test domain, which is analyzed using the malicious domain name analyzer (120) to detect malicious domain names.

In one or more embodiments, the domain name analyzer (126) is further configured to identify and/or extract alphanumeric elements (131) from the domain name set (130). In one or more embodiments, an alphanumeric element is a single character referred to as a unigram. In one or more embodiments, an alphanumeric element is a string of n consecutive characters referred to as an n-gram where n is an integer greater than one. For example, such unigram or n-gram may be identified and/or extracted using parsing techniques known to those skilled in the art. The alphanumeric elements (131) extracted from a grouped test domain is referred to as a test distribution.

In one or more embodiments, the analyzer module (125) includes the distribution metric analyzer (128) that is configured to characterize distribution of alphanumeric elements in the domain name set (130) to generate a distribution metric. In one or more embodiments, the distribution metric is based on information entropy of the collection of alphanumeric elements identified and/or extracted within the domain name set (130). More details of characterizing distribution of aforementioned alphanumeric elements in the domain name set based on the various distribution metrics are described in reference to FIG. 2 below.

The malicious domain name detecting tool (120) may include one or more system computers, which may be implemented as a server or any conventional computing system. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the malicious domain name detecting tool (120), it will be appreciated that a variety of components with various functions may be used to provide the formatting, processing, utility and coordination functions necessary to modify various working data used by the malicious domain name detecting tool (120). The components may have combined functionalities and may be implemented as software, hardware, firmware, or combinations thereof.

Figure 2:
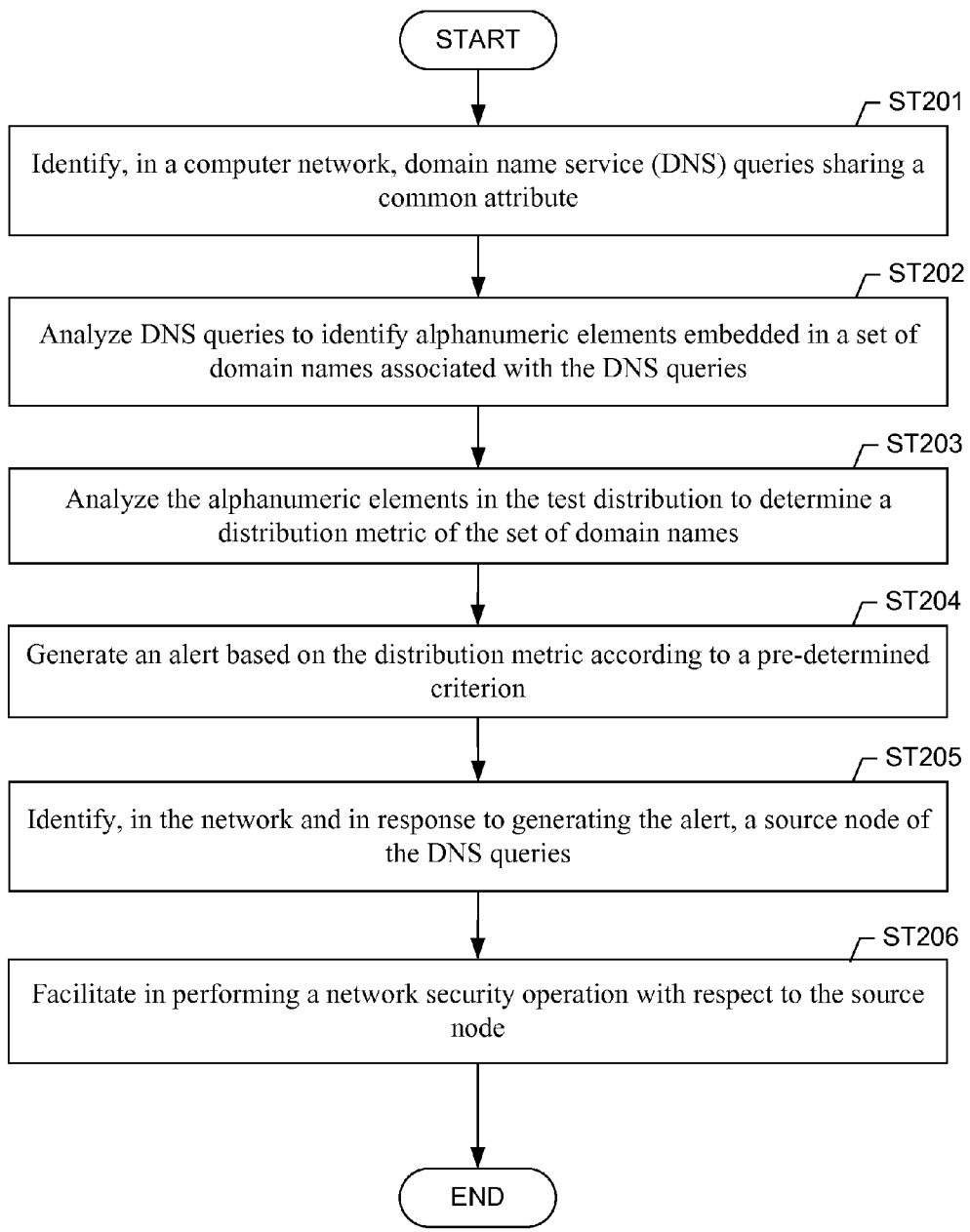
FIG. 2 shows a method flow chart according to aspects of the invention.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

In one or more embodiments of the invention, a network trace is obtained for analysis from a computer network (e.g., Internet). For example, the network trace may be a real-time network trace captured in real-time or a historical network trace previously captured in the computer network. In one or more embodiments, the real-time network trace and/or the historical network trace is captured on a periodic basis (e.g., every minute, hourly, daily, etc.) or in response to an event (e.g., observation or elimination of botnet or spam activity).

In one or more embodiments, the network trace is analyzed to detect malicious domain names and referred to as a network trace under investigation. As described above, malicious domain names may be used in a botnet for C&C purposes or used by a spammer for including in spam emails to promote spammed products. As such, the malicious domain names may be found in DNS queries involved in the botnet C&C and/or the email spam activities.

In one or more embodiments, the network trace is analyzed in a training phase, and referred to as a reference dataset, to fine tune pre-determined parameters (e.g., based distribution, pre-determined threshold, weights, regularization parameter, etc. described below) used in detecting malicious domain names. Example reference dataset includes the non-malicious ISP dataset, non-malicious DNS dataset, and malicious datasets described below.

For example, network traffic trace collected from across 100+ router links at a Tier-1 ISP in Asia is used as a non-malicious ISP dataset that is one day long and provides details of DNS requests and corresponding replies. Specifically, the non-malicious ISP dataset includes approximately 270,000 DNS name server replies. In another example, a reverse DNS crawl of the entire IPv4 address space is performed and the legitimate domain names are filtered out to obtain a list of domain names and their corresponding IP-addresses as a non-malicious DNS dataset. This dataset is further divided into to several parts, each having domains that has 500, 200, 100 and 50 sub-domains. On the other hand, the lists of domain names that are known to have been generated by recent botnets (e.g., Conficker, Torpig, and Kraken) are obtained as malicious datasets. For example, Kraken uses a domain name generator by matching the frequency of occurrence of vowels and consonants as well as concatenating the resulting word with common suffixes such as -able, -dom, etc. In another malicious dataset, a algorithmic domain name generation algorithm is modeled using a publicly available tool, Kwyjibo (e.g., as described in H. Crawford et al. "Automatic domain name generation", Software Practice and Experience, John Wiley & Sons, Ltd., 2008), which generates domain names that are pronounceable yet not found in the English dictionary. The algorithm uses a syllable generator, which first learns the frequency of one syllable following another in words in the English dictionary and then automatically generate pronounceable words by modeling it as a Markov process.

As shown in FIG. 2, initially in Step 201, DNS queries sharing a common attribute in the computer network are identified. In one or more embodiments, the DNS queries sharing a common attribute are identified and/or extracted from the network trace under investigation described above for analysis to detect malicious domain names. In one or more embodiments, the DNS queries sharing a common attribute are identified and/or extracted from the reference dataset described above to fine tune the malicious domain name detection. In either scenario, the common attribute may be (1) a top level domain name corresponding to the DNS queries, (2) an IP address that each of the DNS queries is mapped to, (3) a connected component that each of the DNS queries belongs to, or (4) other suitable attributes. Typically, a DSN query includes a domain name preceded by a string "DNS query". Accordingly, the terms "DNS query" and "domain name" may be used interchangeably throughout this document based on the context.

In one or more embodiments, the domain names from the DNS queries in the network trace under investigation or the reference dataset are grouped based on a common top level domain (TLD) name. After the grouping, each group of DNS queries shares the common attribute of TLD name. The domain name and sub domain name terminology used throughout this document is as follows. In a domain name such as "university.edu", "university" is referred to as the first-level sub-domain, "edu" is referred to as the top-level domain, and "university.edu" is referred to as the first-level domain. Similarly, "physics.university.edu" is referred to as the second-level domain and "physics" is referred to as the second-level sub-domain.

Note that botnets such as Conficker used several first-level domain names (e.g., associated with .ws, .info, .org, etc.) to generate algorithmic domain names. Hence, one way to group the domain names is via the first-level domain name. If several algorithmically generated domain names being queried are detected such as all corresponding to the same first-level domain, then this may indicate a few favorite domains being exploited. Since domain fluxing involves a botnet generating a large number of domain names, only domain names for domains containing a sufficient number (e.g., 50, 100, 200, 500, etc.) of second-level sub-domains are grouped.

In one or more embodiments, the domain names from the DNS queries in the network trace under investigation or the reference dataset are grouped based on a common IP address that each of DNS queries is mapped to. After the grouping, each group of DNS queries shares the common attribute of IP address that each of DNS queries in the group is mapped to. For example, this may indicate a scenario where a botnet has registered several of the algorithmic domain names to the same IP-address of a C&C server. Determining if an IP address is mapped to several such malicious domains is useful as such an IP-address or its corresponding prefix can be quickly blacklisted in order to block the traffic between a C&C server and its bots. Alternatively, the autonomous system representing the IP addresses can be blacklisted to avoid future threats.

A few botnets have taken the idea of domain fluxing further and generate names that span multiple TLDs (e.g., Conficker-C generates domain names in 110 TLDs). At the same time domain fluxing can be combined with IP fluxing where each domain name is mapped to an ever changing set of IP-addresses in an attempt to evade IP blacklists. Indeed, a combination of the two is even harder to detect. To address such scenarios, in one or more embodiments, domain names in the DNS queries are grouped into connected components using a component analysis technique to identify entities that employ multiple domain names (e.g, .ws, .info, .org used in the conficker botnet) and multiple IP addresses in their activities.

In one or more embodiments, the domain names from the DNS queries in the network trace under investigation or the reference dataset are grouped based on a common connected component that each of the DNS queries belongs to in an IP-domain bipartite graph of the DNS queries. For example, the common connected component is identified by performing connected component analysis of the bipartite graph using techniques known to those skilled in the art. After the grouping, each group of DNS queries shares the common attribute of belonging to the same connected component in the IP-domain bipartite graph of the DNS queries. Such component analysis technique is described as follows.

Initially, a bipartite graph G (i.e., IP-domain bipartite graph of the DNS queries) with IP-addresses on one side and DNS query domain names on the other side is constructed. An edge is constructed between a domain name and an IP-address if that IP-address was ever returned as one of the responses in a DNS query. When multiple IP addresses are returned in a DNS query, edges are drawn in G between all the returned IP addresses and the queried domain name. The bipartite graph G is then partitioned into connected components where a connected component is defined as one which does not have any edges with any other components.

Generally, grouping together domain names via connected components allows detecting not only "domain fluxing" but also combination thereof with "IP fluxing". Moreover, computing the distribution metrics over components yields better and faster detection than other grouping methods. In particular, even if botnets were to generate random words and combine them with multiple TLDs in order to spread the generated domain names (potentially to evade detection), as long as these domains are mapped such that at least one IP-address is shared in common, then a group structure is revealed that can be exploited for quick detection. In an example, per-component analysis detects 26.32% more IP addresses than using per-IP analysis and 16.13% more domain names than using per-domain analysis when embodiments of the invention are applied to detect Conficker in a Tier-1 ISP trace.

Returning to FIG. 2 in Step 202, the DNS queries in a group sharing a common attribute, as identified in Step 201 above, are analyzed to identify alphanumeric elements embedded in a set of domain names associated with the group of DNS queries. In one or more embodiments, an alphanumeric element is a single alphanumeric character (i.e., any character, alphabet, numeral, digit, symbol, icon, etc. that can be used in a valid domain name) referred to as a unigram. In one or more embodiments, an alphanumeric element is an n-gram, which is an element of n-consecutive alphanumeric characters (i.e., any character, alphabet, numeral, digit, symbol, icon, etc. that can be used in a valid domain name) where n is an integer larger than one. For example, each unigram or n-gram in each of the domain name in the set of domain names associated with the group of DNS queries is identified and included in a set of alphanumeric elements for further analysis.

In Step 203, the set of alphanumeric elements is analyzed to determine a distribution metric of the set of domain names. In particular, the distribution metric is determined to represent randomness of the distribution of alphanumeric elements in the set. In Step 204, an alert is generated based on the distribution metric according to a pre-determined criterion. In one or more embodiment, the pre-determined criterion includes pre-determined parameters that are fine-tuned during a training phase such that the alert represents, with acceptable (based on a pre-defined level) false positive rates, detection of malicious domain names indicating malicious activities (e.g., domain fluxing from botnet or spam activities) in the computer network.

In one or more embodiments, the distribution metric is based on information entropy of the set of alphanumeric elements. For example, the distribution metric may include a divergence metric as a measure of "distance" between (1) the alphanumeric elements distribution (referred to as the test distribution) associated with the group of DNS queries sharing the common attribute (referred to as the grouped test domain) and identified/extracted from the network trace under investigation and (2) the alphanumeric elements distribution associated with the reference dataset and referred to as the base distribution. In one or more embodiments, the base distribution is determined based on the entire reference dataset and represents randomness of the distribution of alphanumeric elements in the entire reference dataset. In one or more embodiments, the base distribution is determined based on a group sharing the common attribute in the reference dataset and represents randomness of the distribution of alphanumeric elements in the group.

In one or more embodiments, the divergence (or distance) metric is a modified K-L (Kullback-Leibler) divergence metric. As is known to those skilled in the art, the K-L divergence metric is a non-symmetric measure of "distance" between two probability distributions. Specifically, the K-L divergence metric between two discretized distributions P and Q is given by $$D_{KL}(P\|Q) = \sum_{i=1}^{n} P(i)\log\frac{P(i)}{Q(i)}$$

where n is the number of possible values for a discrete random variable. In one or more embodiments, a modified K-L metric is computed using the formula:

$$D_{sym}(PQ) = \frac{1}{2}\left(D_{KL}(P\|Q) + D_{KL}(Q\|P)\right).$$

Here, the probability distribution P represents the test distribution and the distribution Q represents the base distribution from which the distribution metric of the set of domain names under investigation is computed.

Let P=q represents a test distribution computed for the grouped test domain, Q=g represents non-malicious base distribution, and Q=b represents malicious base distribution, the test distribution q is classified as non-malicious if $D_{sym}(qb) > D_{sym}(qg)$ and classified as malicious if $D_{sym}(qb) < D_{sym}(qg)$. Accordingly, an alert is generated in response to the test distribution being classified as malicious. In one or more embodiments, the domain names or a portion thereof in the grouped test domain are identified based on the alert as being generated for malicious activities (e.g., botnet or spam) in the computer network. In one or more embodiments, the non-malicious base distribution g and the malicious base distribution b are adjusted during a training phase to calibrate the malicious domain name detection such that the false detection rate is within a preset limit. An example calibration technique used in the training phase is based on L1-regularized linear regression as described below.

In one or more embodiments, the distribution metric is based on the K-L divergence metric computed using unigrams. Specifically, the test distribution includes unigrams identified in the grouped test domain, specifically the set of domain names under investigation by considering all domain names that belong to the same group sharing common IP-address or top-level domain name. In addition, the K-L divergence metrics of example base distributions are computed for the non-malicious datasets obtained from the ISP dataset or DNS dataset described above as well as malicious datasets obtained based on a known botnet (e.g., Conficker, Kraken, Kwyjibo, etc.) or by modeling a botnet that uses uniformly generated alphanumeric characters (e.g., a-z, 0-9, special characters such as "-", etc.). The probability distribution of unigrams representative of malicious domains is generally expected to follow a randomized (uniform) distribution where the probability of occurrence of every character is roughly the same. The probability distribution of unigrams obtained from non-malicious sub-domains does not follow a uniform distribution, instead, has higher probabilities for certain characters than others. For instance, vowels such as "a" and "e" have relatively different probabilities than other unigrams.

In the event that all (or majority) of the sub-domains of the grouped test domain are composed of randomly generated alphanumeric characters, the distribution associated with the grouped test domain is expected to follow more closely with that of a malicious distribution. Randomized sub-domains help the malicious attackers to quickly change domain names (the technique referred to as domain-fluxing) and thus avoid being blacklisted, or a particular domain name blocked. Human-generated domain names, however, would follow a probability distribution, abundant in vowel characters, which resembles the non-malicious distribution more than the randomized distribution.

Although the K-L divergence metric using unigram distribution can be computed quickly, the use of unigram based distribution metric as the basis for validating a given test distribution has its shortcomings. For example, malicious domain names can be generated by using the same distribution of alphanumeric elements commonly seen for legitimate domains. In such scenario, test distribution captured from the computer network would be recognized as non-malicious. However, such a drawback can be overcome by the use of distribution metric based on bigram distributions. Generally, it would be harder for an algorithm to generate domain names that exactly preserve a bigram distribution similar to legitimate domains. In particular, finding words corresponding to good distribution of bigrams requires the algorithm to consider the previous character already generated while generating the current character thus limiting the choices for the current character.

In one or more embodiments, the distribution metric is based on the K-L divergence metric computed using bigrams. Analogous to the embodiments described above, the test distribution includes bigrams identified in the grouped test domain to form a bigram distribution. For example, using the set of alphanumeric characters a-z and 0-9, the total number of possible bigrams is 36×36 or 1,296.

Although the examples given above regarding the information entropy of the test distribution use specific formulas as well as specific formats of alphanumeric elements (i.e., unigram and bigram), those skilled in the art, with the benefit of this disclosure will appreciate that variations of the example formula and alternative formats of alphanumeric elements may be used in other embodiments of the invention.

As noted above, the grouped test domain is a group of domain names sharing a common attributes. In one or more embodiments, the grouped test domain is a component identified using connected component analysis in the IP-domain bipartite graph of the DNS queries. In such embodiments, classifying a component as malicious (i.e., algorithmically generated) or non-malicious (i.e., legitimate) may be formulated as a linear regression or classification problem in a supervised learning model. In particular, the components of the bipartite graph from a reference dataset are initially labeled (i.e., as malicious or non-malicious) and trained using a L1-regularized linear regression over a portion of the network trace time period associated with the reference dataset (e.g., 10 hours training period out of one day of the ISP trace). For example, all domain names within each of the components found in the reference dataset are labeled based on information obtained from domain reputation sites such as McAfee Site Advisor (offered by McAfee Associates, Inc. of Santa Clara, Calif.), community based website reputation rating tool such as Web of Trust (offered by WOT Services Ltd. of Helsinki, Finland), searching for the URLs on search-engines, etc. Such domain reputation site, community based website reputation rating tools, and search engines providing website reputation information, etc. are referred to as reputation engines.

Next, a component is labeled as malicious or non-malicious depending on a simple majority count. For example, if more than 50% of domain names in a particular component are classified as malicious (adware, malware, spyware, etc.) by any of the reputation engines, then the particular component is labeled as malicious. Further, linear regression techniques are used to train the supervised learning model on the first half of the reference dataset such that the trained model is used to predict (i.e., identify as malicious or non-malicious) the components on the complete reference dataset.

An example linear regression technique is described as follows. Define F as the set of features (or indexes) j which indexes the distribution metrics $x_j$ (e.g., $x_1$ representing K-L_distance on unigrams, $x_2$ representing K-L distance on bigrams, etc.) computed for each component. For example, F may include one, two, or three indexes of the example distribution metrics described above. In other examples, more than three types of distribution metrics may be used and F may include more than three distribution metric indexes. Also define the set of partitioned components of the reference dataset as T and its size in terms of number of components as |T|. Further, define the output value for each component $y_i=1$ if it is labeled malicious or $y_i=0$ if it is labeled non-malicious. Accordingly, the output value $y_i$ is modeled for any component i in T as a linear weighted sum of the values $x_j$ attained by each feature where the weights are represented by $\beta_j$ for each feature $j \epsilon F$ as well as $\beta_0$ as an offset. For example, the base distribution of the grouped test domain may contain unigrams, bigrams, and/or other alphanumeric elements extracted/identified from all top level domain names as well as first level and second level sub-domain names of all domain names in the grouped test domain where K-L_distance on unigrams and K-L distance on bigrams may be computed as $x_1$, $x_2$ for the base distribution. Although two distribution metrics are described in this example, in general, there may be more than two distribution metrics. In one or more embodiments, the model equation is as follows where the calculated value of each $y_i$ may be rounded to 1 or 0.

$$j \epsilon F: y_i = \Sigma_{j \epsilon F} \beta_j x_j + \beta_0 \quad \text{(model equation)}$$

In particular, LASSO, also known as L1-regularized Linear Regression (e.g., as described in Friedman et al. "LASSO and elastic-net regularized generalized linear models", SRI International Technical Report) is used, where an additional constraint is added on each feature to reduce test prediction errors than the non-regularized linear regression since some variables (e.g., regularization parameter) can be adaptively adjusted. In one or more embodiments, 10-fold cross validation is used to choose the value of the regularization parameter $\lambda$, in [0-1] that provides the minimum training error represented by the expression below where $y_i$ represents known status (i.e., malicious or non-malicious) of each component i in the reference dataset T.

$$\underset{\beta}{\operatorname{argmin}} \sum_{i=1}^{|T|} \left( y_i - \beta_o - \sum_{j \in F} \beta_j x_j \right)^2 + \lambda \sum_{j \in F} |\beta_j|$$

In an example, 128 components are initially labeled as non-malicious (e.g., containing content distribution networks (CDNs), mail service providers, large networks like Google) and 1 component with 1413 domain names in the component is initially labeled as malicious belonging to the conficker botnet. In this example, the Gaussian model is used in the linear regression to train the reference dataset, minimizing the misclassification error by varying the penalty parameter $\lambda$. In this example, the misclassification error is minimal when $\lambda=0.0001$. Accordingly, the weights $\beta_j$ for each of the features as well as the offset $\beta_0$ are determined using the linear regression to complete the training of the model. In one or more embodiments, the model equation with weights $\beta_j$ determined based on a reference dataset is applied to any grouped test domain for malicious domain name detection.

In one or more embodiments, components partitioned from the IP-domain bipartite graph of the DNS queries may be classified into different component classes. An example classification is shown in FIG. 3 and described below.

In one or more embodiments, the component classes include a multi component class consisting of components that have multiple IP addresses and multiple domain names. In this class, the distribution metrics $x_j$ of the component may be computed by computing the distribution metrics $x_j$ feature for each of the domain names in the component and then taking the average over all the domain names in the component. Accordingly, the components in this class may be labeled as malicious or non-malicious based on the model equation described above. In particular, an alert is generated identifying the malicious component as containing domain names automatically generated for malicious activities.

In one or more embodiments, the component classes include a IP fan class consisting of connected components from the graph that have only one IP address connected to multiple domains. This class may contain non-malicious components including those (1) providing mail relay service where one mail server is used to provide mail relay for several domains and/or (2) involved in domain parking where one IP-address is used to provide hosting to several domains, etc. In this class, the distribution metrics $x_j$ of the component may be computed by computing the distribution metrics $x_j$ for each of the domain names mapping to the IP address and then taking the average of the distribution metrics $x_j$ for all the domain names. Thereby every IP address would have a feature value. Accordingly, the components in this class may be labeled as malicious or non-malicious based on the model equation described above. In particular, an alert is generated identifying the malicious component as containing domain names automatically generated for malicious activities.

In one or more embodiments, the component classes include a domain fan class consisting of connected components with only one domain name connected to multiple IPs. This class may contain non-malicious components belonging to the legitimate service providers like Google, Yahoo!, etc. In this class, all the domain names are collapsed based on the second level domain name and the Top Level Domain (TLD). The distribution metrics $x_j$ for each such second level domain name and TLD are computed by computing the average of the distribution metrics $x_j$ for all the domain names belonging to such a second level domain name and TLD. Accordingly, the components in this class may be labeled as malicious or non-malicious based on the model equation described above. In particular, an alert is generated identifying the malicious component as containing domain names automatically generated for malicious activities.

Although the examples given above regarding malicious domain name detection calibration uses a L1-regularized linear regression within a partitioned component in the IP-domain bipartite graph of the DNS queries, those skilled in the art, with the benefit of this disclosure will appreciate that variations of the calibration technique may be used in other embodiments of the invention where the grouped test domain is grouped based on common TLD or common IP address.

Returning to FIG. 2, in STEP 205, a source node of DNS queries labeled as malicious is identified in the computer network in response to generating the alert in Step 204. In one or more embodiments, the effort and/or resource (i.e., reverse engineering) required to identify the source node (e.g., bot or spamming machine) generating DNS queries for malicious activities (e.g., controlling a botnet or conducting a spam email campaign) is significantly reduced. Specifically, the grouped test domain labeled as malicious contains a reduced number of domain names such that the effort and/or resource (i.e., reverse engineering) required to identify such source node is much focused as compared to prior art methods.

In Step 206, a network security operation with respect to the source node is performed with the facilitation based on the alert identifying the grouped test domain as containing domain names automatically generated for malicious activities. For example, a DNS server may be configured to block certain domain names by specifying the blocked domain names in the DNS server policy, referred to as domain blacklisting. Further, a network router may be configured to intercept and selectively block DNS traffic (e.g., DNS queries and/or replies) passing over the computer network or a portion thereof. In particular, one or more network router(s)

located logically between the DNS server and the source node (e.g., a bot) sending the malicious DNS queries may be configured to block such bot-generated DNS queries.

The method described above may be applied to a variety of datasets. First, a set of legitimate domain names is obtained via reverse DNS crawl of the entire IPv4 address space. Next, a set of malicious domain names is obtained as generated by Conficker, Kraken and Torpig as well as by modeling a much more sophisticated domain name generation algorithm: Kwyjibo. Finally, the method is applied to one day of network traffic from one of the largest Tier-1 ISPs in Asia and it is demonstrated that the method is capable of detecting Conficker as well as a botnet hitherto unknown.

Although specific formats, structures, or partitions are used as examples in the foregoing description regarding the various components in the malicious domain name detecting tool, user system, and computer network, one skilled in the art, with the benefit of this disclosure, will recognize that other formats or structures may also be used in the system, methods, and examples described without deviating from the spirit of the invention.

Figure 4:
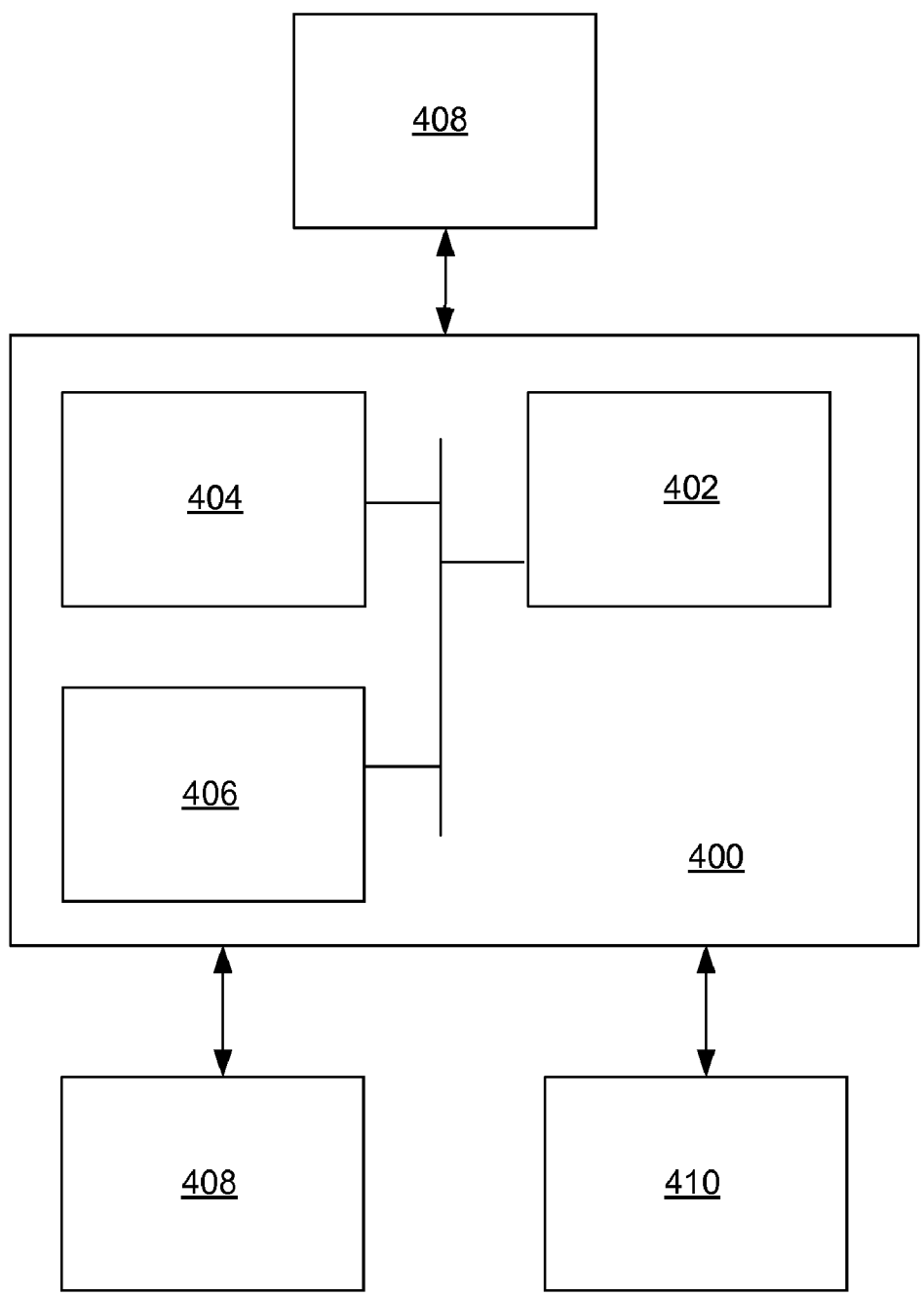
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402) (e.g., central processing unit or CPU), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting automatically generated malicious domain names in a network, comprising:
   identifying a plurality of domain name service (DNS) queries in the network, wherein the plurality of DNS queries share a common attribute;
   analyzing, using a central processing unit (CPU) of a computer, the plurality of DNS queries to identify a plurality of alphanumeric elements embedded in a set of domain names associated with the plurality of DNS queries;
   analyzing, using the CPU, the plurality of alphanumeric elements to determine a distribution metric of the set domain names; and
   generating an alert of domain fluxing based on the distribution metric according to a pre-determined criterion.

2. The method of claim 1, further comprising:
   identifying, in the network and in response to generating the alert, a source node of the plurality of DNS queries; and
   facilitating in performing a network security operation with respect to the source node,
   wherein the automatically generated malicious domain names are used for at least one selected from a group consisting of controlling a botnet and conducting a spam email campaign.

3. The method of claim 1, wherein the common attribute comprises a top level domain name corresponding to the plurality of DNS queries.

4. The method of claim 1, wherein the common attribute comprises an IP address that each of the plurality of DNS queries is mapped to.

5. The method of claim 1, wherein the common attribute comprises a connected component that each of the plurality of DNS queries belongs to, the method further comprising performing connected component analysis of a IP-domain bipartite graph of the plurality of domain name service (DNS) queries.

6. The method of claim 1, wherein each of the plurality of alphanumeric elements consists of at least one selected from a group consisting of a single alphanumeric character and n-consecutive alphanumeric characters where n represents an integer greater than one.

7. The method of claim 1, wherein the distribution metric comprises information entropy of the plurality of alphanumeric elements.

8. A system for detecting automatically generated malicious domain names in a network, comprising:
   a detecting program configured to capture a plurality of domain name service (DNS) queries in the network, wherein the plurality of DNS queries share a common attribute;
   an analyzer program configured to:
   analyze the plurality of DNS queries to identify a plurality of alphanumeric elements embedded in a set of domain names associated with the plurality of DNS queries; and
   analyze the plurality of alphanumeric elements to determine a distribution metric of the set of domain names; and
   a processor and memory storing instructions when executed by the processor comprising functionality to:
   compare the distribution metric and a pre-determined threshold to generate a result; and generate an alert of domain fluxing based on the distribution metric according to a predetermined criterion.

9. The system of claim 8, the instructions when executed by the processor further comprising functionality to:
identify, in the network and in response to generating the alert of domain fluxing, a source node of the plurality of DNS queries; and
facilitating in performing a network security operation with respect to the source node,
wherein the automatically generated malicious domain names are used for at least one selected from a group consisting of controlling a botnet and conducting a spam email campaign.

10. The system of claim 8, wherein the common attribute comprises a top level domain name corresponding to the plurality of DNS queries.

11. The system of claim 8, wherein the common attribute comprises an IP address that each of the plurality of DNS queries is mapped to.

12. The system of claim 8, wherein the common attribute comprises a connected component that each of the plurality of DNS queries belongs to, the system further comprising a program for performing connected component analysis of an IP-domain bipartite graph of the plurality of domain name service (DNS) queries.

13. The system of claim 8, wherein each of the plurality of alphanumeric elements consists of at least one selected from a group consisting of a single alphanumeric character and n-consecutive alphanumeric characters where n represents an integer greater than one.

14. The system of claim 8, wherein the distribution metric comprises information entropy of the plurality of alphanumeric elements.

15. A non-transitory computer readable medium storing instructions for detecting automatically generated malicious domain names network in a network, the instructions when executed by a processor of a computer comprising functionality to:
identify a plurality of domain name service (DNS) queries in the network, wherein the plurality of DNS queries share a common attribute;
analyze the plurality of DNS queries to identify a plurality of alphanumeric elements embedded in a set of domain names associated with the plurality of DNS queries;
analyze the plurality of alphanumeric elements to determine a distribution metric of the set of domain names; and
generate an alert of domain fluxing based on the distribution metric according to a pre-determined criterion.

16. The non-transitory computer readable medium of claim 15, the instructions when executed by the processor further comprising functionality to:
identify, in the network and in response to generating the alert of domain fluxing, a source node of the plurality of DNS queries; and
facilitate in performing a network security operation with respect to the source node,
wherein the automatically generated malicious domain names are used for at least one selected from a group consisting of controlling a botnet and conducting a spam email campaign.

* * * * *

UNITED STATES PATENT AND TRADEMARK OFFICE
CERTIFICATE OF CORRECTION

PATENT NO. : 8,260,914 B1  Page 1 of 1
APPLICATION NO. : 12/821098
DATED : September 4, 2012
INVENTOR(S) : Supranamaya Ranjan It is certified that error appears in the above-identified patent and that said Letters Patent is hereby corrected as shown below:

- Column 20, line 3 (claim 15): please delete "network". Line 3 should read "domain names in a network, the instructions when"

Signed and Sealed this
Eleventh Day of December, 2012

David J. Kappos
*Director of the United States Patent and Trademark Office*